United States Patent [19]

Weihsmann

[11] Patent Number: 4,491,330
[45] Date of Patent: Jan. 1, 1985

[54] ROTARY LIP SEAL

[75] Inventor: Peter R. Weihsmann, Sherwood, Ark.

[73] Assignee: Franklin Electric Co., Inc., Bluffton, Ind.

[21] Appl. No.: 519,322

[22] Filed: Aug. 1, 1983

[51] Int. Cl.³ .............................................. F16J 15/34
[52] U.S. Cl. ....................................... 277/65; 277/183
[58] Field of Search ...................... 277/35, 37, 39, 61, 277/63, 65, 179, 83, 91, 92

[56] References Cited

U.S. PATENT DOCUMENTS

| | | | |
|---|---|---|---|
| 1,891,706 | 12/1932 | de Ram | 277/61 |
| 2,227,408 | 12/1940 | Hately | 277/65 |
| 2,831,713 | 4/1958 | Smith | 277/35 |
| 3,680,977 | 8/1972 | Rabouyt et al. | 277/65 |

*Primary Examiner*—Robert I. Smith
*Attorney, Agent, or Firm*—Marshall, O'Toole, Gerstein, Murray & Bicknell

[57] ABSTRACT

This disclosure relates to a lip seal designed to seal a space between a rotatable shaft and a housing part around the shaft. The housing part is formed of relatively flat material and has a hole formed in it, through which the shaft extends. The seal includes a support band that is sized to have a tight interference fit on the shaft. Extending radially outwardly from the band are two opposed lips that form an annular groove therebetween. The seal is positioned with the housing part in the groove and the lips engaging opposite sides of the housing part. The two lips are constructed with a preload that causes them to sealingly engage the housing part when the housing part is positioned in the groove. The band rotates and makes a sealed connection with the shaft, and the two lips slide against the housing part and form seals therebetween.

9 Claims, 8 Drawing Figures

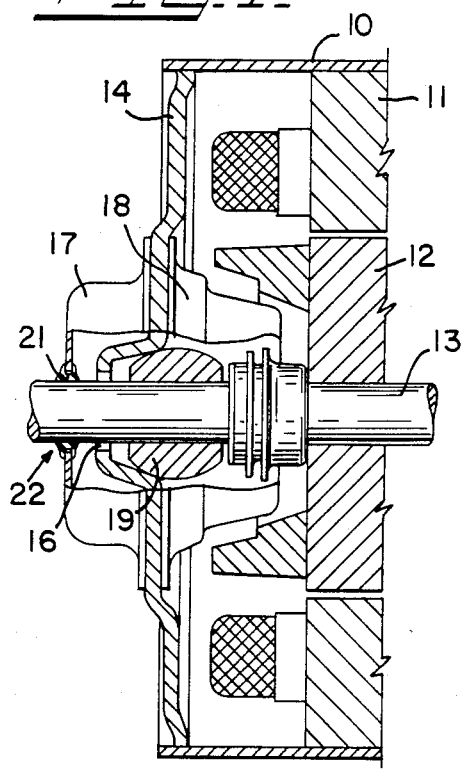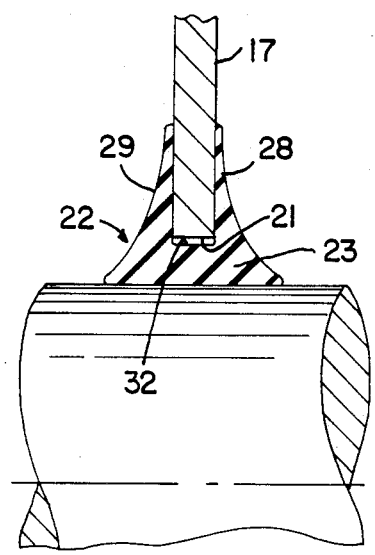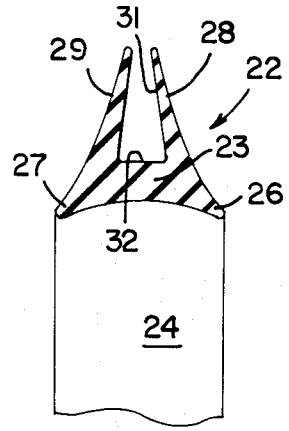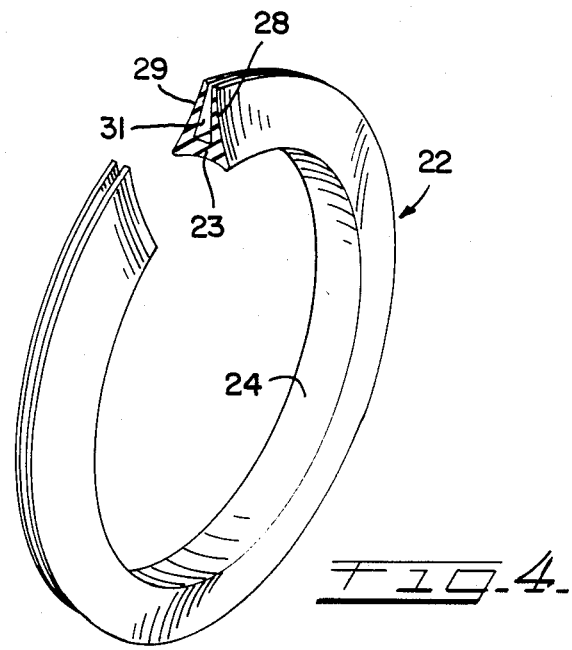

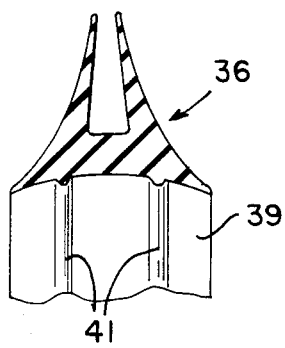
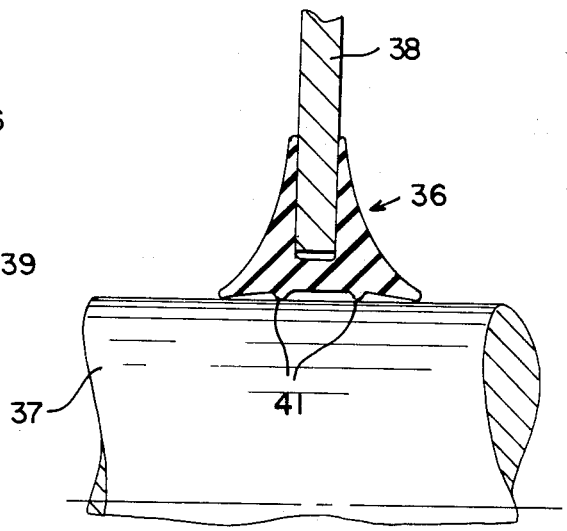
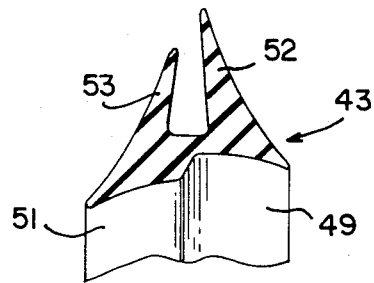
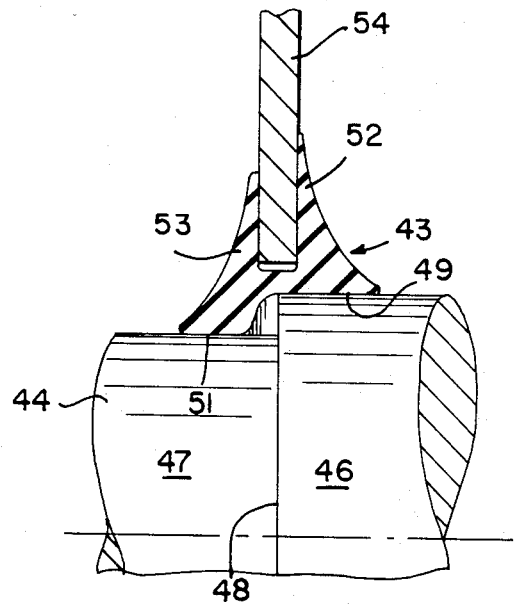

ROTARY LIP SEAL

This invention relates to liquid seals, and more particularly to a rotary lip seal between a rotatable shaft and a housing or frame around the shaft.

BACKGROUND OF THE INVENTION

Many rotary seal designs are well known in the art and are commercially available for sealing a space between two parts. So-called mechanical seals of this nature include members fastened to the two parts and a sliding connection between the two members. Such seals are effective but also relatively expensive and large. Lip seals are less expensive and smaller, and usually include a seal member that is fastened to one of the two parts, the member having a flexible lip that slidingly engages the other part.

U.S. Pat. No. 3,601,412 shows lip seals of this nature. In U.S. Pat. No. 3,601,412, an elastic seal member is fastened to a rotatable shaft and a flexible lip of the member slides against a frame part. It is necessary to hold the lip against the frame part, and this patent shows special supports for this purpose. In an instance where a two-sided seal is needed, FIG. 6 of this patent shows lip seals and supports on opposite sides of the frame part. Such an arrangement is not compact and it is relatively expensive because of the need for the supports that hold the lips against the frame part.

U.S. Pat. No. 3,810,636 shows a bearing seal extending between the races of a roller bearing, the seal including flanges which are located on opposite sides of ribs formed on the races. A problem with this arrangement is that it does not include an inherent preload between the flanges and the ribs, which generally is necessary to ensure a seal during rotary operation and during periods of inactivity.

It is a general object of this invention to provide an improved double-acting lip seal which is compact, relatively inexpensive, and includes an effective preload on the lips.

SUMMARY OF THE INVENTION

A seal in accordance with the present invention is designed to seal a space between a rotatable shaft and a housing part around the shaft. The housing part is formed of relatively flat material and has a hole formed in it, through which the shaft extends. The seal includes a support band that is sized to have a tight interference fit on the shaft. Extending radially outwardly from the band are two opposed lips that form an annular groove therebetween. The seal is adapted to be positioned with the housing part in the groove and the lips engaging opposite sides of the housing part. The two lips are constructed with a preload that causes them to sealingly engage the housing part when the housing part is positioned in the groove.

BRIEF DESCRIPTION OF THE DRAWINGS

The foregoing and other objects and advantages of the present invention will become more apparent from the following description taken in conjunction with the accompanying figures of the drawing wherein:

FIG. 1 is a fragmentary sectional view of an electric motor including a seal embodying the present invention;

FIG. 2 is an enlarged fragmentary sectional view of a portion of the structure shown in FIG. 1;

FIG. 3 is a fragmentary sectional view of the seal;

FIG. 4 is a perspective view showing the seal, with a part of the seal broken away;

FIGS. 5 and 6 are views similar to FIGS. 3 and 2, respectively, and showing an alternative construction; and FIGS. 7 and 8 are views similar to FIGS. 5 and 6, respectively, and showing still another alternative construction.

DETAILED DESCRIPTION OF THE DRAWINGS

FIG. 1 illustrates an electric motor which, aside from the seal to be described in detail hereinafter, may have a conventional construction. Since the electric motor per se does not form part of the present invention, the structural parts will not be described in great detail.

The seal according to this invention may also be used in other mechanisms, and the motor is shown only to illustrate a particularly advantageous use. The motor includes a cylindrical outer shell 10 that has a stator 11 mounted in it. A rotor 12 is fastened to a motor shaft 13 and is located within the cavity formed by the stator 11. Enclosing the end of the space formed by the shell 10 is an end frame 14 that extends across and is secured to the stator shell 10. A centrally located hole 16 is formed in the end frame 14 and the shaft 13 extends through the hole 16. A bearing enclosure formed by sheet metal walls 17 and 18 is secured to opposite sides of the end frame 14 around the hole 16, and the enclosure houses a shaft bearing 19 and a quantity of bearing lubricant. The bearing 19 is preferably supported by the end frame 14. The outer enclosure wall 17 also has a circular opening 21 formed in it in alignment with the opening 16 and the motor shaft 13 extends through the opening 21. Extending across the space between the shaft 13 and the wall 17 is a seal 22 in accordance with the present invention.

With reference to FIGS. 2–4, the seal 22 comprises an annular elastic support band portion 23 that is positioned on and fastened to the shaft 13. The interior diameter of the band 23 is sized relative to the diameter of the shaft 13 such that an interference or friction fit is formed between the support band 23 and the shaft 13 with the result that the seal 22 rotates with the shaft 13 when the shaft rotates. The band 23 is positioned within the opening 21 of the wall 17 and it extends axially of the shaft on both sides of the wall 17. As best shown in FIG. 3, the interior surface 24 of the band 23 preferably has a smoothly curved concave configuration when the seal is in its free or unstressed state, and the opposite ends 26 and 27 of the band 23 are preferably tapered. The concave configuration of the interior surface 24 results in the ends 26 and 27 having a smaller inner diameter than the center area of the band.

The seal 22 further includes two generally radially extending lips 28 and 29 which extend outwardly from the band 23 and are on opposite sides of the wall 17. As shown in FIGS. 2 and 3, the lips 28 and 29 form an annular groove 31 between them and the seal 22 is positioned with the wall 17 extending into the groove 31. As shown in FIG. 2, the inner edge of the hole 21 is preferably spaced slightly from the bottom 32 of the groove 31. With reference to FIG. 3, in the free or unstressed state of the seal 22, the bottom 32 of the groove 31 has a width that is essentially the same as or slightly greater than the thickness of the wall 17. The two lips 28 and 29 are preloaded such that they engage the opposite sides of the wall 17, as shown in FIG. 2, and this is preferably accomplished by shaping the lips 28 and 29 to gradually extend toward each other. In other words, the width of the groove 31 tapers and reduces in width in the outward direction. The thickness of the lips 28 and 29 is preferably tapered in the radial direction, the lips having a reduced thickness at the radially outer ends. This configuration produces lips 28 and 29 which are sufficiently flexible to enable the seal 22 to be mounted on the wall 17 but to also have the lips 28 and 29 sealingly engage the sides of the wall 17.

The seal 22 is made of an elastic material such as Nitrile (Buna "N") Rubber, Polyacrylates or Viton. The specific material and compound hardness employed depends upon the temperature, shaft speed, the viscosity of the fluid being sealed, fluid pressure on each side of the wall 17, and the nature of the contaminants to be sealed against during use.

It will be apparent from FIGS. 1 and 2 that seals are provided at four points. Each of the ends 26 and 27 of the band 23 forms a seal with the shaft 13, and, of course, the entire inner surface 24 also engages the shaft. In addition, the inner surfaces of the two lips 28 and 29 slidingly engage the opposite sides of the wall 17. When the motor shaft 13 is stationary, the preloads on the lips 28 and 29 produces an effective seal which prevents moisture from entering the interior of the motor and prevents lubricant from leaking out of the motor. A labyrinth seal is also formed between the lips 28 and 29 and the wall 17. When the shaft is rotating and the seal 22 is rotating at a relatively high speed, any moisture or dirt that tends to collect on the outer surface of the seal between the lip 29 and the end 27 is thrown radially outwardly away from the seal area by virtue of the centrifugal force (the contaminants will be imparted circumferential velocity somewhat less than the velocity of the lips 28 and 29); thus, the seal also performs the function of a slinger. The centrifugal force on the lips 28 and 29 when the seal rotates at high speed acts on the lips in the radial direction, thereby relieving some of the preload or pressure between the lips and the wall 17, and this is advantageous because it reduces the amount of wear and frictional heat on the lips during high speed use. The loss of preload at high speed is counteracted by the slinging effect of the lips, thus minimizing movement of moisture and/or dirt through the seal.

It will be apparent from the foregoing that a novel and useful seal has been provided. The seal is relatively compact and it may be inexpensively molded from an elastomeric material. The band 23 and the lips 28 and 29 are shaped and sized to preload the respective connections with the shaft 13 and the wall 17, but, of course, the frictional engagement of the seal with the shaft is greater than that between the seal and the wall 17. The two lips 28 and 29 cooperate to preload each other on opposite sides of the wall 17, thereby avoiding the need for separate holding members. The contact pressure between the lips and the wall 14 is preferably at a maximum at the outer ends of the lips and decreases toward the bottom of the groove 31. The nominal lip contact force for the seal is preferably approximately one pound per inch of lip circumference. The frictional forces between the seal and the shaft and the wall are functions of the seal configuration and material. The hardness of the material should be chosen to produce optimum conditions of seal flexibility and hardness, recognizing that increased hardness results in favorable wear resistance and reduced coefficient of friction. The amount of friction may also be controlled by mixing additives into the elastomeric material.

FIGS. 5-8 illustrate seals in accordance with this invention, having alternative configurations of the inner periphery.

In FIGS. 5 and 6, a seal 36 is connected between a rotatable shaft 37 and a flat lateral wall 38. The inner periphery 39 has a concave configuration similar to the surface 24, and in addition a plurality of annular, radially inwardly extending ribs 41 are provided. The ribs 41 tightly engage the shaft 37 and form high pressure points which enhance the seal with the shaft.

The seal 43 shown in FIGS. 7 and 8 is designed for use with a stepped shaft 44. The shaft 44 has large and small diameter portions 46 and 47 which are joined by a step 48. The inner periphery of the seal 43 similarly has different diameter portions 49 and 51 which mate respectively with the shaft portions 46 and 47. The seal 43 has two opposing lips 52 and 53 which engage opposite sides of a wall 54. The lips 52 and 53 may have the same outer diameter or they may have different diameters, as shown. The seal shown in FIGS. 7 and 8 forms an effective seal with a stepped shaft which would be difficult or impossible to seal using an ordinary seal that is fastened to the wall 54 and slides on the shaft.

What is claimed is:

1. A rotary lip seal for use in a space between a rotatable shaft and a housing part around the shaft, the housing part being formed of relatively flat material and having a hole formed in it through which the shaft extends, said seal comprising an elastic support band portion that is adapted to have a tight interference fit on the shaft, two elastic opposed lips formed on and extending radially outwardly from said band and forming an annular groove therebetween, said lips being shaped to have inherent preloads toward each other, said seal being adapted to be positioned with the housing part in the groove and said preloads holding the lips sealing engaging opposite sides of the housing part, said band being adapted to have greater frictional engagement with the shaft than said lips have with said housing part so that said seal is adapted to rotate with the shaft.

2. A seal as in claim 1, wherein said lips when in an unstressed state slant towards each other, whereby the width of said annular groove reduces in the radially outward direction.

3. A seal as in claim 1, wherein said lips gradually taper to a reduced thickness at the radially outer ends thereof.

4. A seal as in claim 1, wherein the inner surface of said band has a concave shape when in an unstressed state.

5. A seal as in claim 4, wherein a plurality of radially inwardly extending ribs are formed on said inner surface.

6. A seal as in claim 1, wherein said inner surface of said band has different diameter portions.

7. A rotary lip seal comprising an annular elastic band portion, and two elastic lip portions formed integrally with and extending substantially radially outwardly from said band portion, said lips having inherent preloads toward each other, said lips being axially spaced apart and forming with said band portion an annular groove therebetween.

8. Apparatus comprising a rotatable shaft, a generally flat part extending adjacent said shaft and having a circular hole therein through which the shaft extends, said flat part being substantially perpendicular to the axis of said shaft, the edge portion of said hole being spaced from said shaft and a seal extending between said shaft and said flat part, said seal comprising a band portion positioned around and fastened to said shaft, said seal further comprising two elastic lip portions formed on and extending generally radially outwardly from said band portion, said lip portions being axially spaced and forming an annular groove therebetween and said edge portion extending into said groove, said lip portions being preloaded toward each other and against said flat part and slidably engaging the radial side surfaces of said flat part.

9. A seal as in claim 8, wherein said shaft has different diameter portions forming a step therebetween, and said band portion having an inner surface overlying said step, said inner surface having diameter portions mating with said diameter portions of said shaft.

* * * * *